United States Patent [19]

Takeuchi et al.

[11] Patent Number: 4,774,217

[45] Date of Patent: Sep. 27, 1988

[54] CATALYTIC STRUCTURE FOR CLEANING EXHAUST GAS

[75] Inventors: Akira Takeuchi; Yukihisa Takeuchi, both of Aichi; Hitoshi Yoshida, Okazaki; Kazuyuki Ito, Nishio, all of Japan

[73] Assignee: Nippondenso Co., Ltd., Kariya, Japan

[21] Appl. No.: 873,785

[22] Filed: Jun. 12, 1986

[30] Foreign Application Priority Data

Jun. 13, 1985 [JP] Japan ................... 60-128996

[51] Int. Cl.⁴ .............. B01J 27/224; B01J 21/12; B01J 21/14; B01J 21/04
[52] U.S. Cl. .................. 502/178; 423/213.5; 502/238; 502/251; 502/252; 502/334; 502/355; 502/527
[58] Field of Search .......... 502/178, 238, 251, 252, 502/334, 527, 355

[56] References Cited

U.S. PATENT DOCUMENTS

| | | | |
|---|---|---|---|
| 3,895,917 | 7/1975 | Ravault | 502/527 |
| 3,901,821 | 8/1975 | Retallick | 502/527 |
| 4,118,199 | 10/1978 | Volker et al. | 502/527 |
| 4,134,733 | 1/1979 | Volker et al. | 502/527 |
| 4,308,233 | 12/1981 | Narumiya et al. | 502/74 |

FOREIGN PATENT DOCUMENTS

| | | | |
|---|---|---|---|
| 52-23592 | 2/1977 | Japan | 502/178 |
| 53-114793 | 10/1978 | Japan | |
| 55-88848 | 7/1980 | Japan | |
| 56-126437 | 10/1981 | Japan | 502/527 |
| 60-46980 | 3/1985 | Japan | 502/527 |

OTHER PUBLICATIONS

Abstract of Japanese Kokai 55-88848-7/1980.
Abstract of Japanese Kokai 53-114793-6/1978.

Primary Examiner—Paul E. Konopka
Attorney, Agent, or Firm—Cushman, Darby & Cushman

[57] ABSTRACT

A catalytic structure for cleaning exhaust gas from automobiles, etc., is provided. The catalytic structure comprises a ceramic carrier having a three-dimensional network skeleton forming the intercommunicating voids therein and a catalyst-carried activated alumina layer formed on the surface of the three-dimensional network skeleton. This catalytic structure is produced by contacting a ceramic carrier with a catalyst-containing solution and drying the carrier by evaporating the solvent in the solution so that the catalyst will be carried at a higher density in the activated alumina layer on the side of the skeleton surface against which side the incoming exhaust gas does not impinge, than on the side against which the exhaust gas impinges.

8 Claims, 3 Drawing Sheets

CATALYTIC STRUCTURE FOR CLEANING EXHAUST GAS

BACKGROUND OF THE INVENTION

1. Field of the Invention

This invention relates to a catalytic structure which can be effectively used for removing harmful substances such as carbon monoxide, nitrogen oxides and hydrocarbons contained in exhaust gas from automobiles and other sources of combustion gas discharge.

2. Background Art

Restrictions on release of harmful substances such as carbon monoxide, nitrogen oxides, hydrocarbons, etc., contained in exhaust gas from automobiles and various types of combustion apparatus have become increasingly strict in recent years. As an effective means for cleaning such exhaust gas, use is generally made of redox catalysts composed of noble metals.

Methods are known for incorporating such noble metal catalysts in a carrier, as for instance disclosed in Japanese Patent Kokai (Laid-Open) No. 88848/80. According to the method of this patent, an activated alumina layer is formed on the surface of the three-dimensional network skeleton of a porous ceramic carrier, and said activated alumina layer is impregnated with an aqueous solution of a complex containing a noble metal for forming catalyst and dried, thereby obtaining a catalytic structure for cleaning exhaust gas, which structure has the catalyst uniformly carried in the surface of said three-dimensional network skeleton.

The noble metals such as platinum, rhodium, palladium, etc., usable as cleaning catalysts for such noxious matters as carbon monoxide, nitrogen oxides and hydrocarbons exist only scantly on the earth and are therefore very expensive.

The present inventors have noted in their studies that said conventional catalytic structure had the following problem. When exhaust gas is passed through the catalytic structure for treatment, the surface of the three-dimensional network skeleton of the catalytic structure presents two sides relative to the exhaust gas flow, that is, one side against which the incoming exhaust gas flow impinges and the other side against which the exhaust gas does not impinge, and naturally, the oxides of such substances as iron, sulfur, lead, etc., contained in exhaust gas tend to deposit on the side against which the exhaust gas flow impinges. Such deposits of oxides deteriorate the catalytic activity of said noble metal catalyst by poisoning or covering it. The catalyst carried on the side against which the exhaust gas flow impinges can perform its normal catalytic action in the early phase of use but loses its activity in long-time use, so that with said conventional catalytic structure, the costly noble metal catalyst could not be effectively utilized in long-time use.

SUMMARY OF THE INVENTION

The object of this invention is to provide a catalytic structure which enables effective utilization of noble metal catalysts for a long time.

According to the present invention, there is provided a catalytic structure for cleaning an exhaust gas characterized in that the catalyst is carried at a higher density on the side of the three-dimensional network skeleton surface against which side the incoming exhaust gas flow does not impinge, in other words, opposite to the other side against which the exhaust gas flow impinges, than on the above-mentioned other side.

BRIEF DESCRIPTION OF DRAWINGS

FIG. 8(a) and FIG. 8(b) are a sectional view and a frontal view, respectively, showing the configuration of one example of the catalytic structure of this invention.

DETAILED DESCRIPTION OF PREFERRED EMBODIMENTS

The catalytic structure in accordance with this invention has a three-dimensional network skeleton forming the intercommunicating voids in the structure, in which the catalyst is carried at a higher density on the side of the three-dimensional skeleton surface against which side the incoming exhaust gas flow does not impinge, than on the side against which the exhaust gas flow impinges. When the exhaust gas is passed through the catalytic structure, the catalyst inactivating substances in the exhaust gas are caught and deposit on the side against which the exhaust gas flow impinges, on which side the catalyst is carried in a relatively small amount, but on the other hand, since the exhaust gas forms a very turbulent flow, a substantial portion thereof makes its way round to the side of said skeleton surface against which side the exhaust gas flow does not impinge, and thus the exhaust gas is brought into contact with the catalyst sufficiently to undergo intended catalytic action.

This invention will hereinafter be described in accordance with the examples thereof illustrated in the accompanying drawings.

Figure 2A:
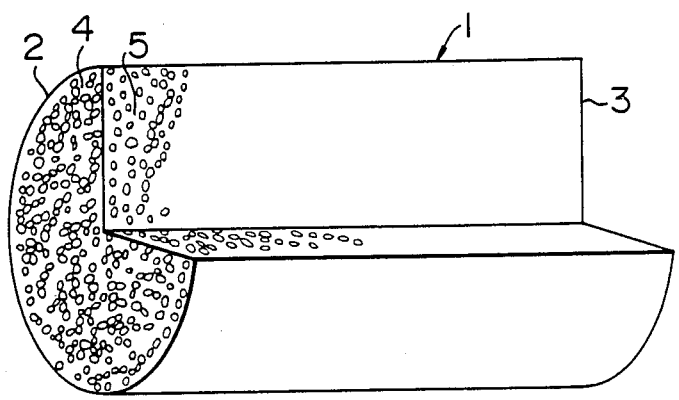
FIG. 2(a) is a pictorial sectional view illustrating the general configuration of the catalytic structure shown in FIG. 1.
Figure 2B:
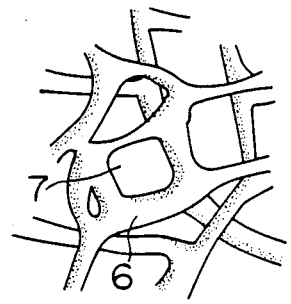
FIG. 2(b) is an enlarged schematic fragmental view of the three-dimensional network skeleton.

FIG. 2(a) is a perspective view, partly shown in section, of a foamed ceramic carrier 1 having a three-dimensional network skeletal structure according to this invention, and FIG. 2(b) is an enlarged fragmental view of the three-dimensional network skeletal portion. The sized carrier 1 is 107 mm in diameter, 78 mm in length and about 700 cc in volume. The exhaust gas to be treated enters the carrier at the end face 2 and leaves the carrier at the other end face 3. The periphery of the structure constitutes a 2-5 mm thick crust 4 having few intercommunicating voids for preventing the escape of exhaust gas from the periphery. The inside portion 5 of the structure is constituted by a three-dimensional network skeleton 6, essentially comprising interconnecting strands forming the intercommunicating voids 7 as illustrated in FIG. 2(b). The number of the intercommunicating voids 7 in the three-dimensional network skeleton 6 per unit area, that is, the porosity of the skeleton is 8-20 meshes/inch (indicating the number of the voids per inch). The skeleton is made of, for instance, cordierite.

Figure 1:
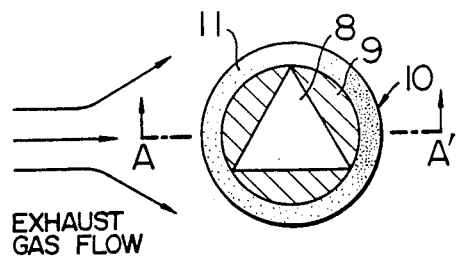
FIG. 1 is a diagrammatic illustration of a section of the three-dimensional network skeleton of a catalytic structure using a ceramic foam carrier according to this invention.
Figure 3:
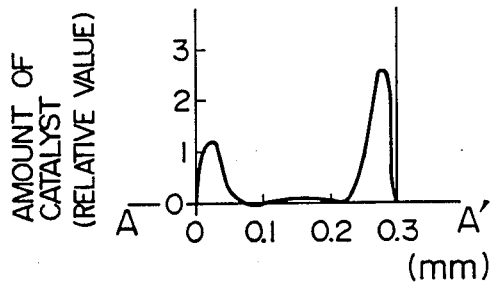
FIG. 3 is a graph showing the distribution of carried catalyst amount in the catalytic structure, in which the horizontal central line A—A' along the section of FIG. 1 is plotted as abscissa and the relative catalyst amount as ordinate.

As schematically illustrated in section in FIG. 1, the three-dimensional network skeleton 6 is composed of a cordierite layer 9 having a cavity at its center, said cordierite layer being coated with an about 30 $\mu$m thick activated $\gamma$-alumina layer of an extremely small particle size designed for enhancing the catalyst carrying performance. Said $\gamma$-alumina layer 10 carries a catalyst 11 composed of platinum and rhodium (5:1 by weight) for removing the harmful gaseous substances in exhaust gas through a redox reaction. As seen from FIG. 3 illustrating the carried amount of catalyst along a section A—A' parallel to the exhaust gas flow, the catalyst is carried at a 2-3 times higher density on the downstream side of the exhaust gas flow, that is, the side against which the exhaust gas flow does not impinge, than on the upstream side.

The method of producing said catalytic structure for cleaning exhaust gas according to this invention will be described below.

Generally, for producing a ceramic carrier of a three-dimensional network structure, an organic compound such as polyurethane foam having a similar three-dimensional network structure is used as a base material, and a ceramic material is applied on the surface of said base material and calcined, causing the organic compound as the base material to be burned and scattered to let the surrounding ceramic material turn into a same structure as that of the base material. This process will be described in detail below.

First, a mold having a cavity configured in conformity to the external shape of the carrier 1 to be made is prepared, and a wax type releasing agent is applied by spraying or brushing to the interior surface of the cavity of said mold, followed by heating the mold to a termperature of 30°-50° C. Then a mixed solution for forming an urethane foam, prepared by mixing an organic isocyanate, a polyol, a foam stabilizer, a foaming agent and a catalyst, is poured into the cavity of the mold while stirring and mixing said solution. Tolylene diisocyanate or methylene diisocyanate, or a mixture thereof can be used as said organic isocyanate. As the polyols can be used polymeric polyols composed of polyether polyols and/or polyester type polyols, or mixtures thereof with polyether polyols. Water or halogen-substituted aliphatic hydrocarbons (such as trifluoromonochloromethane) or mixtures thereof can be used as the foaming agent. Alcohol-modified silicone can be used as said foam stabilizer. As for the catalyst, ternary amines and their organic salts usable effectively as a reaction catalyst for alcohols and isocyanates can be used as the catalyst for promoting the resinification reaction, and morpholine, ethanolamines and the like usable effectively as a reaction catalyst for water and isocyanates can be used as the catalyst for promoting the foaming reaction. After the mixed solution in the cavity has been foamed, the mold is heated to a temperature of 100°-120° C. for a period of 20-30 minutes to cure the foamed material and then the mold is split to take out the formed urethane foam.

Then this urethane foam is impregnated with a ceramic slurry, and after removing the excess slurry by using an air gun or a centrifuge, the slurry is further applied to a thickness of 2-5 mm for forming a crust layer 4 at the periphery. This slurry-impregnated urethane foam is dried at a temperature of 500°-800° C. and then calcined at a temperature of 1,000°-1,300° C. for a period of about 7 hours to obtain a foamed ceramic carrier having a three-dimensional network structure. The base material for the slurry is prepared by first forming a powder mixture containing magnesium oxide (MgO), alumina ($Al_2O_3$) and silica ($SiO_2$) which, when calcined, forms a composition of cordierite, said powder mixture being if necessary heated and made into cordierite ceramic and further powdered to form a synthetic cordierite powder, then adding thereto 5-10% by weight of a binder such as methyl cellulose, polyvinyl alcohol or the like, 2-3% by weight of a surface active agent, dispersant, etc., and 50-100% by weight of water, and stirring the mixture.

The ceramic foam carrier obtained in the manner described above is then immersed in a slurry prepared by mixing with $\gamma$-alumina 10-20% by weight of alumina sol, 20-30% by weight of alumina nitrate, 50-60% by weight of colloidal silica and 100-150% by weight of water. After removing the excess slurry, the carrier is calcined at a temperature of 500°-1,000° C. for a period of about one hour to form a coat of activated alumina.

Then a noble metal catalyst is carried on the thus prepared ceramic foam carrier in the manner described below.

Figure 4:
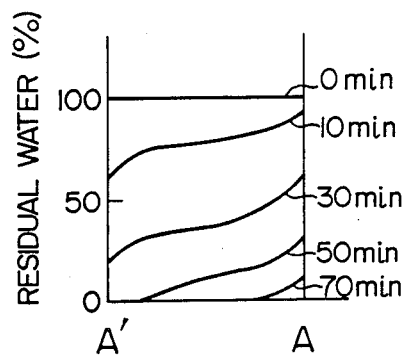
FIG. 4 is a graph illustrating the relation between the drying time and the change of amount of residual water in the catalyst incorporating process.

Said carrier is immersed in an aqueous solution having dissolved therein 1-3% by weight of a catalyst containing chloroplatinic acid ($H_2PtCl_6 \cdot 6H_2O$) and rhodium chloride ($RhCl_3 \cdot 3H_2O$) in a ratio of 5:1 by weight per metal. Then the carrier is lightly hydro-extracted and hot air of 100°-120° C. is blown into said carrier 1 from its exhaust gas outlet end face 3 at a space velocity (S.V.) of $5 \times 10^4$-$10^5$/hr, said hot air being passed through the intercommunicating voids in the carrier while striking against the three-dimensional network skeleton and discharged out from the exhaust gas inlet end face 2 to thereby dry the carrier. The space velocity referred to herein represents the value determined by dividing the amount of air passing per unit time by the total volume of the carrier 1. FIG. 4 shows the distribution of the amount of water along the sectional line A—A' of FIG. 1 in relation to the drying time. It will be seen that the side of the skeletal structure (front side) facing the flow of hot air opposite to the direction of exhaust gas flow in the drawing is dried quickly. As water at this (front) side of the skeletal structure is quickly evaporated for the solution to concentrate on this side, the remaining solution moves to and amasses in this side in a way that the solution is supplied there from the other side, with the result that the catalyst is carried at a high density on this side of the skeletal structure. In this drying process, if the carrier 1 is held vertically with the exhaust gas outlet end face 3 being allowed to face downward and hot air is flown upwardly through the carrier from its lower end, the intended object can be accomplished more effectively owing to the effect of gravitational force which acts to expedite gathering of the catalyst solution on the side facing the flow of hot air. This carrier is further subjected to a heat treatment at 700° C. for about 10 minutes to form a metallic catalytic structure.

The effect of the thus prepared catalytic structure of this invention will be described below.

Figure 5:
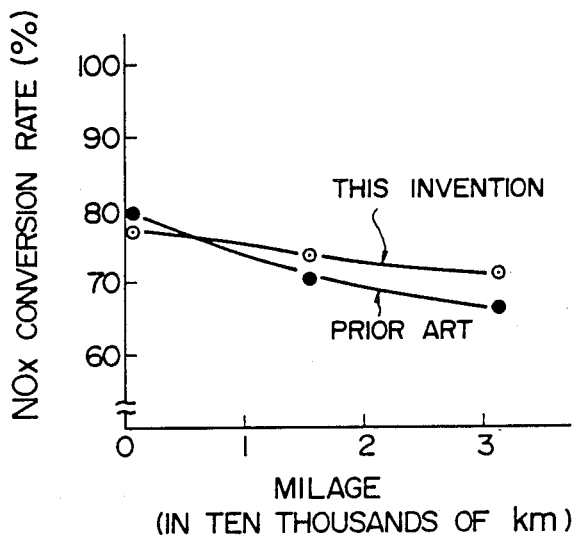
FIG. 5 is a graph showing the relation between the conversion rate of nitrogen oxide (NOx) in exhaust gas from an automobile and the milage of the automobile in use of the catalytic structure of this invention and a conventional catalytic structure.

FIG. 5 is a graph showing a comparison of NOx cleaning effect of the catalyst carrier 1 of this invention and that of a conventional carrier in which the same amount of catalyst is carried uniformly. Both the carriers tested were of the same size and the porosity of the three-dimensional network skeletal structure was 13 mesh/in in both the carriers. The exhaust gas treated had a temperature of 300° C. and was passed through the carriers at a space velocity of $10^5$/hr. As seen from FIG. 5, the catalytic structure of this invention is 2-3% lower in initial cleaning performance than the conventional structure but becomes higher in cleaning performance than the latter as the milage reaches the 1,900–2,500 miles (3,000–4,000 km) mark, and thereafter the difference in cleaning effect between the two grows steadily. This attests to the fact that in the early state of use where the catalyst is still not deactivated at all, the catalytic structure having the catalyst carried evenly on both the sides of the three-dimensional skeleton surface shows a slightly higher cleaning performance because of the greater chance of contact between the exhaust gas and catalyst, but as the mileage of the automobile increases, the catalyst on the exhaust gas impinging side is deactivated accordingly and, therefore, the structure of this invention having the catalyst carried at a higher density on the exhaust gas non-impinging side becomes higher in cleaning performance.

Figure 6:
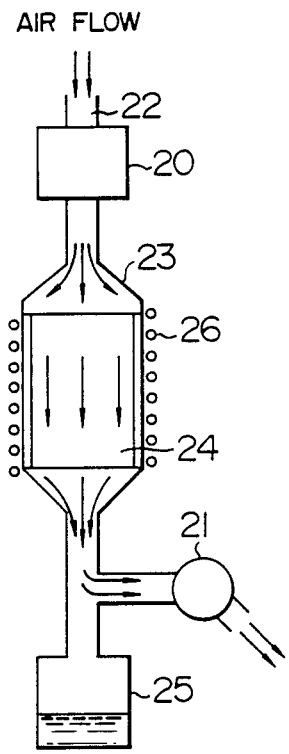
FIG. 6 is a schematic illustration of one example of apparatus used for producing the catalytic structure of this invention.

The alternative method of producing the catalyst carrier of this invention will be described below with reference to the schematic illustration of FIG. 6.

An aqueous catalyst solution containing chloroplatinic acid and rhodium chloride in a ratio of 5:1 by weight is atomized into liquid particles of 1–10 microns by an atomizer 20 using an ordinary ultrasonic vibrator. These liquid particles are entrained on the stream of air taken into the apparatus from the air inlet 22 by the operation of a vacuum pump 21 and are passed through the intercommunicating voids in the catalyst carrier 24 housed in a case 23. While passing through the carrier 24, said liquid particles deposit on the three-dimensional network skeleton of said ceramic foam carrier 24. Those liquid particles which did not deposit on the carrier are collected by a trap 25 and reused. A heater 26 is disposed around the case 23 so that it can be overheated to facilitate deposition of the liquid particles on said catalyst carrier 24. It is usually controlled so that the carrier 24 is heated to around 50° C. Thus, by introducing the catalyst-laden liquid particles entrained on the air stream from one direction and passing them through the catalyst carrier 24 so that they impinge and deposit on the three-dimensional network skeleton of said carrier 24, it is possible to let the metal catalyst deposit at a higher density on the side of the skeleton surface against which side the gaseous flow does not impinge, than on the side against which the gaseous flow impinges, as illustrated in FIG. 2(b). The carrier 24 having the liquid particles deposited thereon is dried in air and then heat-treated at 700° C. for 10 minutes in air to form an active catalyst.

The catalytic structure of this invention can be also produced by the following method.

Figure 7A:
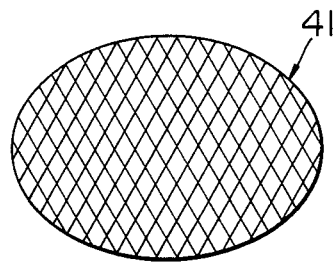
FIG. 7(a), FIG. 7(b) and FIG. 7(c) show schematically a frontal view, an enlarged view thereof and a sectional view, respectively, of one example of the catalytic structure according to this invention.
Figure 7B:
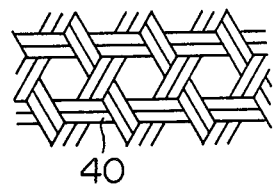
Figure 7C:
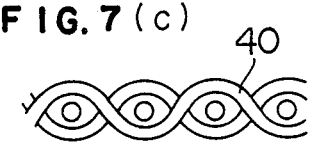

FIG. 7(a) shows a catalyst carrier composed of a plain cloth 41 made by knitting ceramic fibers 40 of 90% alumina and 10% silica into a network texture. An enlarged frontal view of a network skeletal portion of the catalyst carrier is shown in FIG. 7(b), and a sectional view thereof is shown in FIG. 7(c). The cloth is placed in a bell-jar of an ordinary vacuum deposition apparatus used for depositing metals, and platinum is deposited on the cloth. Since the metal particles to be deposited advance in a beeline in the vacuum, platinum is deposited in a greater amount on the upper side of the surfaces of fibers 40 constituting the fabric network than on the lower side.

Figure 8A:
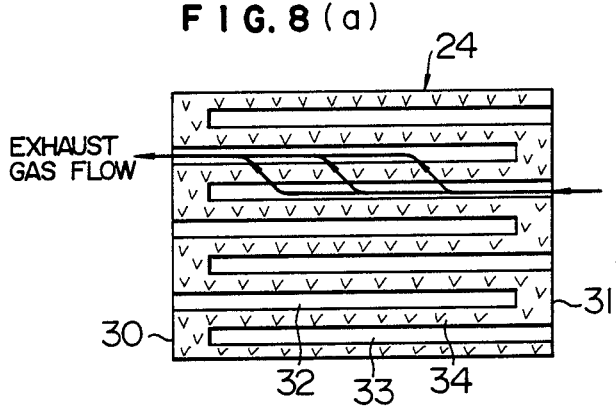
Figure 7B:
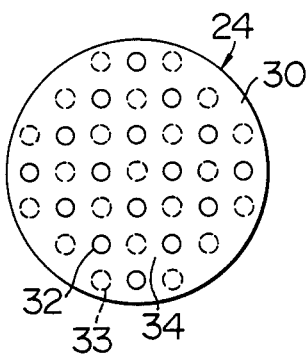

The catalyst carrier of this invention can be of the structure such as shown in FIG. 8 where (a) is a sectional view taken in the axial direction and (b) is a frontal view taken from the exhaust gas inlet end face 30. In this structure, there are provided the inlet holes 32 extending in the axial direction, which holes are open at the inlet end face 30 and closed at the outlet end face 31 and may, for instance, be circular in sectional shape, and the similar outlet holes 33 closed at the inlet end face 30 and open at the outlet end face 31, and the partition walls 34 are made of a three-dimensional network ceramic foam. The sectional shape of said holes may be polygonal instead of circular.

In the above-described embodiments of the invention, the catalysts used are composed of a platinum-rhodium system or platinum alone for removing nitrogen oxides and hydrocarbons in exhaust gas by a reduction or oxidation reaction, but it is also possible to employ various types of noble metal- and metal oxide-catalysts which are capable of removing nitrogen oxides, carbon monoxide, hydrocarbons, etc. Also, although an aqueous solution was used in the described embodiments as the solution of noble metal compounds for forming the catalyst, one may as well use the solvents of a relatively low boiling point, such as ethyl alcohol, which are capable of dissolving said noble metal compounds.

The ceramic foam carrier used in the described embodiments of the invention may be of any configuration provided that it has a three-dimensional network structure, and the catalyst preparation methods in the described embodiments of the invention can be applied to all of such carrier designs. Cordierite ceramic was used for forming the ceramic foam in said embodiments, but it is possible to use various other types of ceramic materials such as silicon carbide, silicon nitride, alumina, β-spodumene and the like.

In accordance with this invention, as described in detail above, a foamed ceramic carrier having a three-dimensional network skeleton forming the intercommunicating voids therein is provided, in which characteristically the catalyst is deposited at a higher density on the side of the skeletal surface against which side the incoming exhaust gas flow does not impinge, than on the side against which the exhaust gas flow impinges, thereby minimizing the influence of the catalyst-deactivating substances contained in exhaust gas to enable effective long-time use of the catalytic structure for cleaning the harmful gaseous substances such as nitrogen oxide, carbon monoxide, hydrocarbons, etc., in exhaust gas. Therefore, where a same amount of noble metal catalyst is used, the catalytic structure of this invention can more effectively perform its cleaning action than the catalytic structure in which the catalyst is carried uniformly throughout the structure. This enables a saving of the expensive noble metal catalyst and hence a cost reduction in the production of catalytic structures.

What is claimed is:

1. A process for producing a catalytic structure for cleaning an exhaust gas, which comprises the steps of:
   immersing in the body of a catalyst-containing solution a ceramic carrier having opposite ends and consisting of a three-dimensional network skeleton comprising interconnecting strands and intercommunicating voids and an activated alumina layer formed on the surface of each of said strands; and
   drying said carrier to evaporate a solvent in said solution by flowing hot air into said carrier from an end thereof, said hot air being passed thorough said intercommunicating voids while impinging against the strands and discharged out from the other end of said carrier, thereby to have said catalyst carried at a higher density on the side of the activated alumina layer of each of said strands against which the hot air impinges, then on the other side on which exhaust gas impinges.

2. A process for producing a catalytic structure for cleaning an exhaust gas, which comprises the steps of:
   atomizing a catalyst-contaiing solution into fine particles, entraining said particles in an airstream; and
   flowing such airstream into one end of a ceramic carrier having opposite ends and consisting of a three-dimensional network skeleton comprising interconnecting strands and intercommunicating voids and an activated alumina layer formed on the surface of each of said strands, said airstream being passed through said intercommunicating voids to impinge said entrained fine particles against said strands and discharged out from the other end of said carrier, thereby to have the catalyst carried at a higher density on the side of the activated alumina surface of each of said strands against which said airstream impinges, then on the other side against which exhaust gas impinges.

3. A catalytic structure made by the process defined by claim 1.

4. A catalytic structure made by the process defined in claim 2.

5. The process according to claim 1, wherein the carrier is dried by holding said carrier vertically so that the exhaust gas outlet end faces downward and flowing hot air upwardly into said carrier from its lower end.

6. The process according to claims 1 or 2, wherein said ceramic carrier having a three-dimensional network skeleton is a ceramic foam obtained by impregnating a polyurethane foam with a ceramic slurry and then burning said polyurethane foam.

7. The process according to claim 1 or 2, wherein the ceramic is selected from cordierite, silicon carbide, silicon nitride, alumina and $\beta$-spodumene.

8. The process according to claim 1 or 2, wherein said strands are in a form of ceramic fibers, woven into a three-dimensional network structure.

* * * * *